United States Patent [19]

Lüchinger

[11] Patent Number: 4,700,793
[45] Date of Patent: Oct. 20, 1987

[54] PRECISION BALANCE

[75] Inventor: Paul Lüchinger, Uster, Switzerland

[73] Assignee: Mettler Instrumente AG, Greifensee, Switzerland

[21] Appl. No.: 931,546

[22] Filed: Nov. 14, 1986

[30] Foreign Application Priority Data

Feb. 28, 1986 [CH] Switzerland ............................ 835/86

[51] Int. Cl.$^4$ ...................... G01G 23/18; G01G 21/28
[52] U.S. Cl. ..................................... 177/181; 177/238
[58] Field of Search ....................... 177/180, 181, 238

[56] References Cited

U.S. PATENT DOCUMENTS

| | | | |
|---|---|---|---|
| 1,784,098 | 12/1930 | Heusser | 177/181 X |
| 2,614,825 | 10/1952 | Kadlec et al. | 177/181 |
| 4,465,152 | 8/1984 | Schmitter | 177/180 |
| 4,664,207 | 5/1987 | Knothe et al. | 177/181 |

FOREIGN PATENT DOCUMENTS 3508873 6/1986 Fed. Rep. of Germany .
0461121 10/1968 Switzerland ........................ 177/238

Primary Examiner—George H. Miller, Jr.
Attorney, Agent, or Firm—Toren, McGeady & Associates

[57] ABSTRACT

A precision balance including sliding side doors and an upper cover forming the weighing chamber of the balance. The side doors and the cover can be moved individually or coupled together either manually or driven by a motor. Side parts of the support member form the connection between the side doors and the upper cover. In addition, the side doors are connected to each other by means of a plate extending underneath the weighing chamber and the balance housing. The connection between the movable parts is effected by means of sliding bolts provided in handles. The individual sliding bolts facilitate a coupling between the sliding side doors and-/or the cover. The plate extending under the weighing chamber facilitates a connection of the two side doors so that the latter can be moved simultaneously either with or without the upper cover.

14 Claims, 4 Drawing Figures

PRECISION BALANCE

BACKGROUND OF THE INVENTION

1. Field of the Invention

The present invention relates to a precision scale which includes a weighing dish and a weighing chamber which encloses the weighing dish from all sides. The weighing chamber is defined by a stationary front pane, sliding doors provided on each side slidably rearwardly away from the front pane, and an upper cover which is also rearwardly slidable. The sliding doors are connected to the upper cover by means of a support member.

2. Description of the Prior Art

Precision scales of the above-described type are known in the art. German Gebrauchmuster DE-M No. 7736324 shows a precision scale in which the two side doors are rearwardly slidably mounted in the balance housing in the conventional manner. In addition, the upper end wall of the weighing chamber is provided with another opening which is opened and closed by means of a rearwardly slidable pane.

In another precision scale of the above-described type, a stationary front pane is connected to the housing of the balance by means of two web members which are attached to the top edge of the front pane at a distance from the side edges of the front pane. A pane provided between the two web members can be pushed rearwardly. The two pane portions extending to the sides of the two web members are connected to the two sliding side panes and can be moved rearwardly together with the latter. It is possible in this manner to enlarge the side opening of the weighing chamber, i.e., the access to the weighing chamber is slightly improved so that, for example, the opening of an Erlenmeier flask placed on the weighing dish can be reached.

These known balances have the substantial disadvantage that the weighing chamber is not accessible from the side as well as from the top without the presence of obstructing structural members. The access to the weighing chamber always remains obstructed in some manner.

It is, therefore, the primary object of the present invention to provide a precision balance whose weighing chamber is formed by sliding side doors and an upper cover arranged in such a way that they can be moved rearwardly in an optional manner, so that the weighing chamber becomes accessible from the side and the top either completely or partially.

It is another object of the present invention to simplify the manipulation of the sliding doors during weighing.

SUMMARY OF THE INVENTION

In accordance with the present invention, the support member referred to hereinabove for connecting the upper cover to the sliding doors effects this connection by means of side parts which are slidable into or over the balance housing on a guide member.

The front pane of the weighing chamber is connected to the balance housing only with its lower edge. Thus, the balance according to the present invention provides the advantage that the weighing chamber becomes completely accessible when the side doors and the upper cover are slid rearwardly.

In the past, the frame parts for supporting the sliding side doors and/or the upper cover had been connected to the front wall of the weighing chamber. In accordance with the present invention, these frame parts are constructed as a rearwardly sliding support member which carries the upper cover and is movable together with the latter. As a result, the weighing chamber can be made accessible not only from the side or the top, but also from an oblique angle.

Upper handles are connected to the support member and lower handles are connected to a plate extending underneath the balance housing and the weighing chamber. Sliding bolts provided in the handles make it possible to connect the sliding doors and the cover as desired. By means of the plate to which the lower handles are connected it is possible to either move both sliding doors simultaneously or to move the sliding door located on the opposite side.

Guide members for the plate arranged in the bottom of the balance housing facilitate sliding of the doors without vibration. The two side parts of the support member may serve as a means for receiving the upper cover and also as guide members for the sliding side doors and they may include grooves for guide rollers which are housed in a roller cage.

A resilient support of a guide rail provided for the side parts of the support member provides the advantage that the support member slides together with the upper cover without play and vibrations.

A single motor in driving engagement with the plate facilitates sliding of the various parts forming the enclosure of the weighing chamber as desired.

The various features of novelty which characterize the invention are pointed out with particularity in the claims annexed thereto and forming a part of this disclosure. For a better understanding of the invention, its operating advantages and specific objects attained by its use, reference should be had to the drawings and descriptive matter in which they are illustrated and described preferred embodiments of the invention.

DETAILED DESCRIPTION OF THE INVENTION

Figure 1:
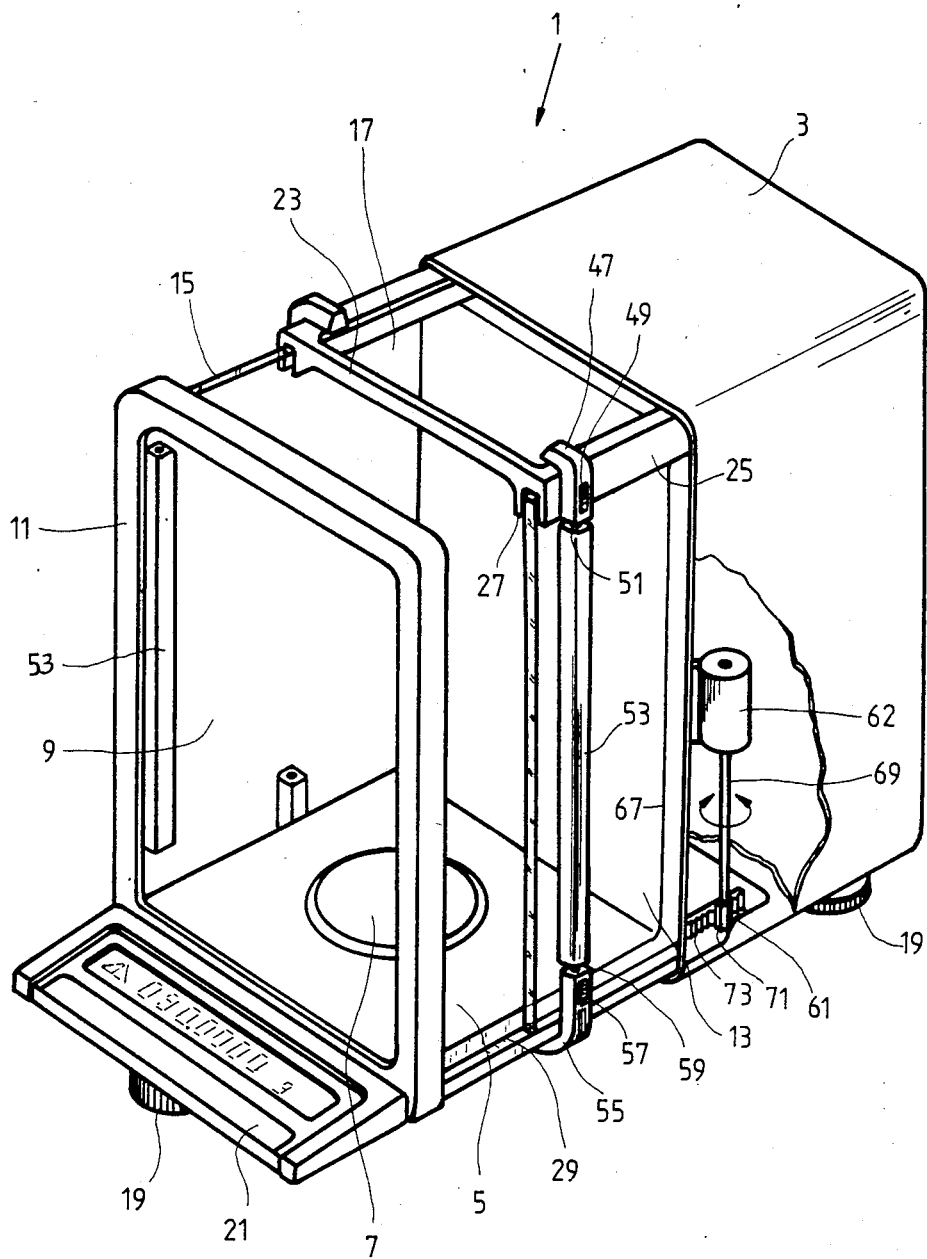
FIG. 1 is a perspective view of a precision balance according to the invention, with sliding side doors and upper cover being partially slid back.

As illustrated of FIG. 1 of the drawing, the precision scale 1 according to the invention includes a housing part 3 which receives the weighing mechanism, a weighing chamber 5 with a weighing dish 7, a front pane 9 forming the front end face of weighing chamber 5. The front pane 9 may be surrounded by a frame 11. The balance 1 further includes two sliding side doors or panes 13, 15 which are slidable rearwardly into the balance housing 3, and an upper cover 17 which is also slidable rearwardly into balance housing 3. Balance 1 rests on three support legs 19 one of which is arranged underneath an indicator panel 21.

Upper cover 17 is surrounded at least on its sides by a support member 23 whose side parts 25 define on the other side thereof a recess 27 having an essentially U-shaped cross section. The recesses 27 are engaged by the upper edges of the sliding side doors 13 and 15. The lower edges of the sliding side doors 13 and 15 rest on shoulders 29 of balance housing 3.

Figure 3:
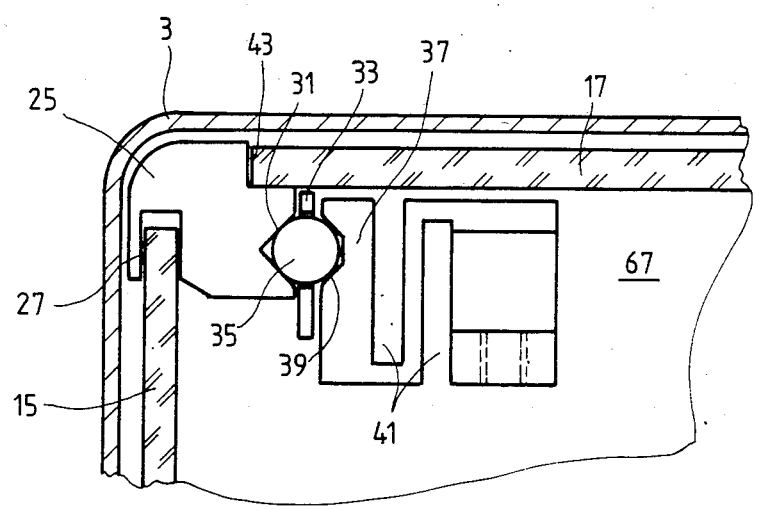
FIG. 3 is an enlarged detail of the cross-sectional view shown in FIG. 2 through an upper guide member.

As illustrated in FIG. 3, side parts 25 of support member 23 have on their sides facing each other grooves 31 which are engaged by balls 35. Balls 35 are held together by means of a cage 33. Balls 35 are guided in a groove 39 formed in a guide rail 37 which is arranged at the top of balance housing 3. Guide rail 37 is preferably elastically mounted. In the example illustrated in FIG. 3, the elasticity of guide rail 37 is obtained by slot-shaped recesses 41 which weaken the guide rail 37 to such an extent that the latter acts as a spring and can be mounted with initial tension. Of course, guide rail 37 can also be elastically mounted on balance housing 3 by means of a spring or an equivalent expedient.

The upper edges of support member 23 have a shoulder 43 each in which the upper cover 17 is placed. In the illustrated embodiment, upper cover 17 is a glass pane. Support member 23 of the upper cover may be of metal or a suitable plastics material.

Instead of a ball or roller guide for support member 23, it is also possible to use a friction bearing of metallic material or of plastics material. Support member 23 may also be a multiple-part telescopic rail in which two movable parts each travel half of the total distance.

Instead of two side parts 25 mounted above the two sliding doors 13, 15, it is also possible to provide a single frame part in the center of the upper cover 17. In this embodiment, the upper cover 17 is formed by inwardly bent parts of the sliding doors 13, 15.

Figure 2:
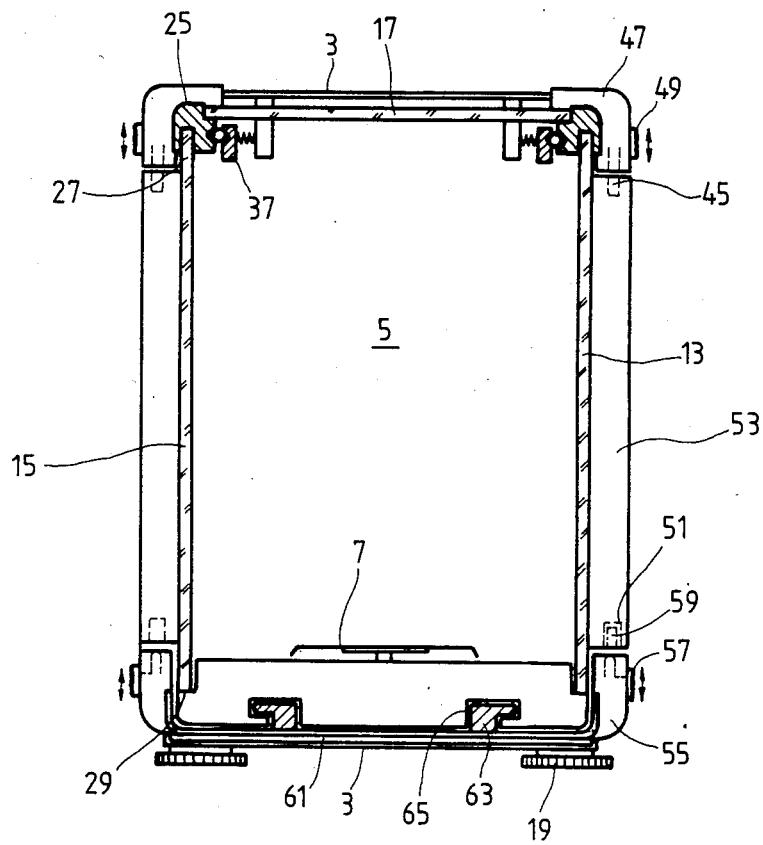
FIG. 2 is a cross-sectional view taken through the weighing chamber parallel to the front pane.

Handles 47, containing sliding bolts 45 are fastened on both sides to the side parts 25 of support member 23 near the front edge thereof. As schematically illustrated in FIG. 2, sliding bolt 45, for example, a cylindrical bolt, is actuated by a preferably corrugated slide 49 which slightly projects above the surface of handle 47. Sliding bolt 45 is capable of engaging an indentation 51 formed in an end face of a ledge 53 attached to each sliding side door 13, 15.

In the same manner as handle 47 is arranged at the top of weighing chamber 5, a handle 55 is arranged at the bottom thereof. Handle 55 has a slide 57 and a sliding bolt 59 which is capable of engaging ledge 53 from below. The handles 55 arranged on both sides of the balance are connected to each other by means of a plate or web 61 extending below balance housing 3 and weighing chamber 5. Either in the center or on the sides of plate 61, as illustrated in FIG. 2, there are connected guide rails 63 which are guided in corresponding guide grooves 65 formed in longitudinal direction in the bottom of balance housing 3 or weighing chamber 5. Of course, instead of guides shaped as grooves, guides having different shapes can also be used. Roller guides can also be utilized.

Only the forward portion of plate 61 has a width which equals that of balance housing 3. The rearward portion of the plate is recessed on both sides so that, when the plate 61 is completely pushed back the latter cannot touch the legs 19 while a sufficiently long guidance is still provided which eliminates canting when force is applied from only one side, as illustrated in FIG. 1.

The ledges 53 which, as illustrated in FIG. 1, extend over the entire height of the sliding side doors 13 and 15 can of course also be made of short ledge portions which contain the indentations 51 for the engagement of the sliding bolts 45 and 59. Of course, it is also possible to provide the sliding bolts 45, 59 with slides 49, 57 in the ledges 53 and to provide the indentation 51 in the handles 47, 55 on support member 25. Sliding bolts 45, 59 are preferably guided in handles 47, 55 in a frictionally locking manner so that they remain in the pushed-out or the pushed-in position.

A drive motor 62 is fastened to the rear wall 67 of weighing chamber 5 and includes a pinion 71 fastened to a vertical shaft 69. Pinion 71 engages in toothing 73 formed on plate 61. Thus, motor 62 can drive plate 61 and, as desired, sliding side doors 13, 15 and cover 17. In a preferred embodiment, the connection between motor 62 and toothing 73 can be disconnected during manual operation.

Figure 4:
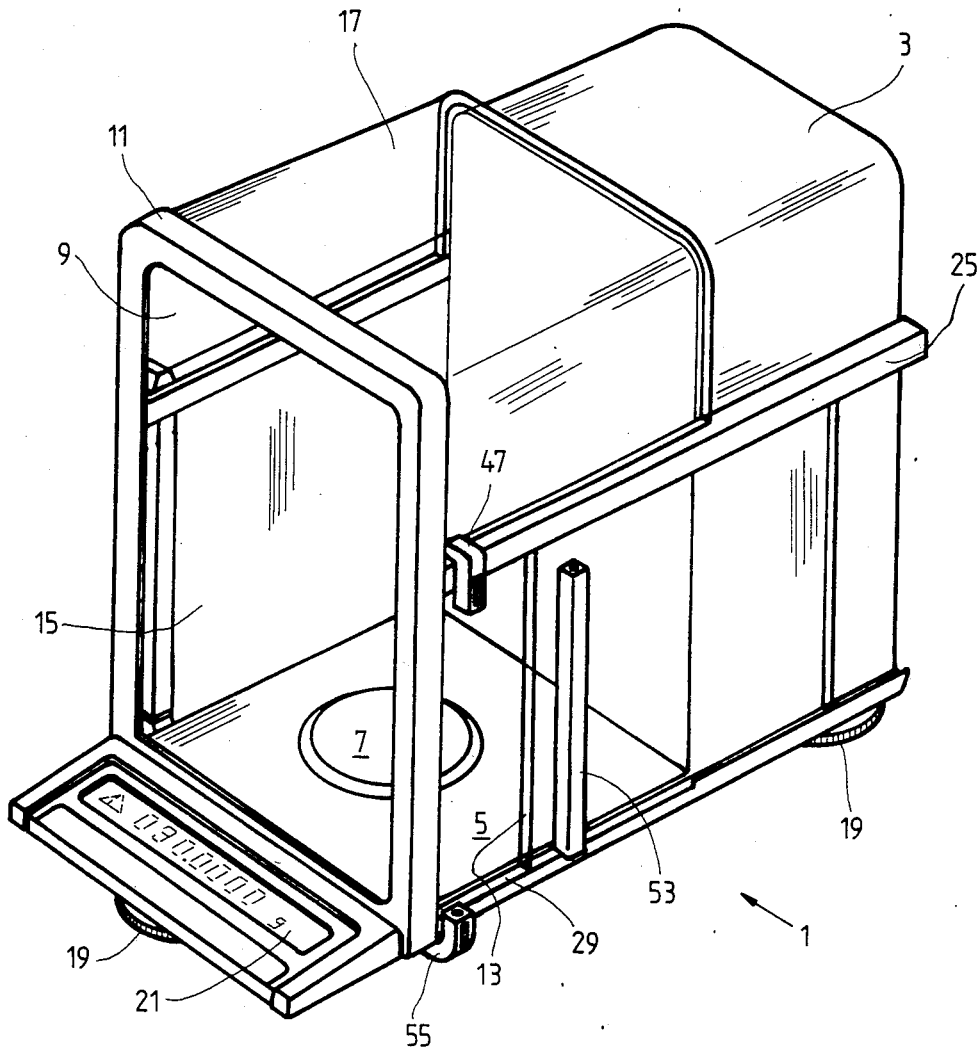
FIG. 4 is a perspective of another embodiment of the precision scale according to the invention, wherein the upper cover is not a plane member, but is constructed as a hood.

FIG. 4 illustrates another embodiment of the invention in which the upper cover 17 is not formed by a plane glass pane placed in support member 23, but is formed as a hood whose bottom edges rest on support member 23 or its side parts 25. Sliding doors 13, 15 as well as the hood, when moved rearwardly, slide along the outside of balance housing 3, not into balance housing 3 as is the case in the previously described embodiment. Accordingly, the guide rails 37 are to be fastened on the outside of balance housing 3.

In the precision balance 1, according to the present invention, the sliding side doors 13 and 15 as well as the upper cover 17 can be opened in various ways. The two sliding side doors 13 and 15 can be opened individually or simultaneously, either with or without the upper cover 17. On the other hand, it is also possible to open only one sliding side door 13 or 15 together with the upper cover 17 or to open only the upper cover 17 alone.

For simultaneously opening more than one of the side doors 13, 15 and the upper cover 17, the two parts to be opened together are coupled by means of sliding bolts 45, 59 in handles 47, 55. For example, sliding side door 13 and upper cover 17 can be connected to each other and be moved together by sliding the sliding bolt 45 of upper handle 47 into the indentation in ledge 53. If additionally the sliding door 15 is to be moved or opened for completely opening the entire weighing chamber 5, sliding bolt 45 of the handle 47 provided on the side of sliding door 15 must be brought into engagement with the indentation of ledge 53 of sliding door 15.

Upper cover 17 and one of the sliding doors 13 or 15 can of course also be moved simultaneously without actuating the sliding bolts by simultaneously grasping and pushing the handle 47 and ledge 53.

To be able to simultaneously move the two sliding side doors 13 and 15 without the upper cover 17, it is necessary to push the sliding bolts 59 provided in the lower handles 55 fastened to plate 61 from below into the indentations provided in ledges 53. Thus, when one of the handles 55 is pushed rearwardly the oppositely located sliding door is also moved at the same time.

As is clear from the above, the precision balance according to the invention affords the possibility for the person using the balance to use the left hand for grasping the handle 55 located on the side of side door 15 but not engaged therewith for moving the side door 13 and, if desired, the upper cover 17. In this manner, it is possible to open the weighing chamber with the left hand which is usually free and to work within the weighing chamber 5 with the right hand.

Left-handed persons can open the side door 15 and, if desired, the upper cover 17 by grasping the handle 55 located on the side of the right sliding door 13.

While specific embodiments of the invention have been shown and described in detail to illustrate the application of the inventive principles, it will be understood that the invention may be embodied otherwise without departing from such principles.

I claim:

1. A precision balance, comprising a balance housing, a balance base supporting the balance housing, a weighing dish placed on the balance base and surrounded by a weighing chamber located in front of the balance housing, the weighing chamber defined by a stationary front pane mounted on the balance base on the side of the weighing chamber opposite the balance housing, two rearwardly sliding side doors and a rearwardly sliding upper cover, a support member placed on top of the side doors, the support member including side parts resting on the top edges of the side doors and forming a connecting means between the upper cover and the side doors, a guide means supported in the balance housing for guiding the side parts, wherein the side parts are slidable rearwardly into or over the balance housing.

2. A precision balance according to claim 1, wherein the upper cover is connected to the support member and is movable therewith.

3. A precision balance according to claim 1, wherein at least one of the two sliding side doors is connectable by means of sliding bolts to the upper cover so that the side doors and the upper cover can be moved simultaneously.

4. A precision balance according to claim 1, comprising a plate extending underneath the weighing chamber, handles attached to the plate and sliding bolts for engaging the side door mounted in each handle, so that the side doors move simultaneously when one of the handles is pushed.

5. A precision balance according to claim 4, wherein guide bars extending parallel to the side doors are attached to the plate, and wherein the base of the balance housing defines guide grooves for receiving the guide bars.

6. A precision balance according to claim 4, comprising a drive motor connected to the plate for moving the plate.

7. A precision balance according to claim 1, wherein the side parts of the support member define on the underside thereof a first groove for receiving the top edge of the side doors, and wherein the side parts define on the sides facing the weighing chamber a guide groove for receiving a guide member.

8. A precision balance according to claim 7, wherein a second groove is defined in the guide means for receiving the guide member, the second groove extending parallel to the side doors and located opposite the guide rails.

9. A precision balance according to claim 8, wherein the guide member is a cage member including rollers.

10. A precision balance according to claim 8, wherein the guide member is a cage member including balls.

11. A precision balance according to claim 8, wherein the guide means is mounted resiliently so that the guide member is longitudinally movably supported in the guide groove of the side part and the second groove.

12. A precision balance according to claim 8, wherein the guide member is a travelling member.

13. A precision balance according to claim 1, wherein the sliding side doors include an upwardly extending wall portion and an inwardly projecting cover portion, and wherein the side parts of the support member are located immediately adjacent one another.

14. A precision balance according to claim 1, wherein the upper cover is hood-shaped and includes downwardly extending side portions, and wherein the side parts of the support member are arranged so as to be in contact with the bottom edges of the side portions of the cover.

* * * * *